United States Patent
Assarpour

(10) Patent No.: US 8,634,417 B2
(45) Date of Patent: Jan. 21, 2014

(54) METHOD AND APPARATUS PROVIDING SELECTIVE FLOW REDISTRIBUTION ACROSS MULTI LINK TRUNK/LINK AGGREGATION GROUP (MLT/LAG) AFTER PORT MEMBER FAILURE AND RECOVERY

(75) Inventor: Hamid Assarpour, Arlington, MA (US)

(73) Assignee: Avaya Inc., Basking Ridge, NJ (US)

( * ) Notice: Subject to any disclaimer, the term of this patent is extended or adjusted under 35 U.S.C. 154(b) by 323 days.

(21) Appl. No.: 13/152,011

(22) Filed: Jun. 2, 2011

(65) Prior Publication Data
US 2012/0307623 A1    Dec. 6, 2012

(51) Int. Cl.
*H04L 12/28* (2006.01)
*H04L 12/56* (2011.01)

(52) U.S. Cl.
USPC ................ 370/389; 370/217; 370/225

(58) Field of Classification Search
USPC ................ 370/389–392, 216–225
See application file for complete search history.

(56) References Cited

U.S. PATENT DOCUMENTS

| | | | | |
|---|---|---|---|---|
| 8,351,429 B2* | 1/2013 | Assarpour | | 370/389 |
| 8,351,431 B2* | 1/2013 | Assarpour | | 370/390 |
| 8,385,335 B2* | 2/2013 | Assarpour | | 370/389 |
| 8,477,791 B2* | 7/2013 | Assarpour | | 370/400 |
| 2008/0285555 A1* | 11/2008 | Ogasahara | | 370/389 |
| 2009/0067324 A1* | 3/2009 | Licardie et al. | | 370/225 |
| 2010/0290458 A1* | 11/2010 | Assarpour | | 370/389 |
| 2010/0290469 A1* | 11/2010 | Assarpour | | 370/392 |

* cited by examiner

*Primary Examiner* — Chuong T Ho
(74) *Attorney, Agent, or Firm* — Anderson Gorecki & Rouille LLP

(57) ABSTRACT

A method, apparatus and computer program product are presented. In a system having at least one Multi Link Trunk/Link Aggregation Group (MLT/LAG), a table is provided for each MLT/LAG, each table having at least one entry, each entry including at least two fields, a first field comprising a port member identification (ID) field and a second field comprising a port member status field. A port member status is checked for a port when a packet flow hashes into the table, and the status for the port member is determined. When the port member status is in a first state, then the associated port member ID is used as a destination port to transmit to. When the port member state is in a second state, then a next entry in the port table is accessed to find a next available entry having a port member status that is in the first state and the corresponding port member ID of the port member state that is in the first state is used as a destination port to transmit to. The first state is UP and the second state is DOWN.

16 Claims, 3 Drawing Sheets

METHOD AND APPARATUS PROVIDING SELECTIVE FLOW REDISTRIBUTION ACROSS MULTI LINK TRUNK/LINK AGGREGATION GROUP (MLT/LAG) AFTER PORT MEMBER FAILURE AND RECOVERY

BACKGROUND

Data communication networks may include various computers, servers, nodes, routers, switches, hubs, proxies, and other devices coupled to and configured to pass data to one another. These devices are referred to herein as "network elements," and may provide a variety of network resources on a network. Data is communicated through data communication networks by passing protocol data units (such as packets, cells, frames, or segments) between the network elements over communication links on the network. A particular protocol data unit may be handled by multiple network elements and cross multiple communication links as it travels between its source and its destination over the network. Hosts such as computers, telephones, cellular telephones, Personal Digital Assistants, and other types of consumer electronics connect to and transmit/receive data over the communication network and, hence, are users of the communication services offered by the communication network.

Network elements are typically implemented to have a control plane that controls operation of the network element and a data plane that handles traffic flowing through the network. The data plane typically will have a collection of line cards having ports that connect to links on the network. Data is received at a particular port, switched within the data plane, and output at one or more other ports onto other links on the network. To enable the data to be handled quickly, the data plane is typically implemented in hardware so that all of the decisions as to how to handle the data are performed using hardware lookups, etc.

Two or more links may be grouped to form a Multi-Link Trunk (MLT). MLT is a method of link aggregation that allows multiple point-to-point links to be aggregated together in order to provide a single logical trunk. An MLT provides the combined bandwidth of the multiple links, as well as the physical layer protection against failure of any single link. Each MLT is assigned a MLT group ID (MLT-ID), which is a global value within the cluster and unique across the cluster nodes. An MLT with all its port members only on one node is referred to as a normal MLT group. An MLT group where its port members are on two or more nodes is referred to as a Split MLT or SMLT group.

Link Aggregation Group (LAG) uses multiple network cables/ports in parallel to increase the link speed beyond the limits of any one single cable or port, and to increase the redundancy for higher availability. While the description below and the Figures refer to a SMLT, the same concepts apply to MLT and LAG and the terms SMLT, MLT and LAG are used interchangeably throughout the rest of the application.

SUMMARY

MLT (Multi Link Trunk) or LAG (Link Aggregation Group) is a solution to two problems with Ethernet connections: bandwidth limitation and lack of redundancy. MLT/LAG provides a method to control the bundling of several physical ports together to form a single logical channel. Flow hashing is typically used to load balance the flows across the bundle. When a physical link or port fails, the sender redistributes the flows across the remaining ports within the bundle. When the failed port eventually comes back online, the sender again distributes the flows across all ports within the bundle as it was prior to the failure. When a port fails, it is expected that packets will be lost until flows are redistributed to other port members. Also, when the failed port is recovered and put back online, the flows again are redistributed to the original distribution prior to the failure.

Conventional mechanisms such as those explained above suffer from a variety of deficiencies. One such deficiency is that during both failover and recovery, the flow redistribution is not restricted to only the flows that were on the failed port and includes unaffected ports. Embodiments of the invention significantly overcome such deficiencies and provide mechanisms and techniques that provide selective flow distribution.

In a particular embodiment, in a system having at least one Multi Link Trunk/Link Aggregation Group (MLT/LAG), the method includes providing a table for each MLT/LAG, each table having at least one entry, each entry including at least two fields, a first field comprising a port member identification (ID) field and a second field comprising a port member status field. The method further includes checking a port member status for a port when a packet flow hashes into the table, and determining the status for the port member. The method also includes wherein when the port member status is in a first state (UP), then using the associated port member ID as a destination port to transmit to; and when the port member status is in a second state (DOWN), then accessing a next entry in the port table to find a next available entry having a port member status that is in the first state and using the corresponding port member ID of the port member status that is in the first state as a destination port to transmit to.

Other embodiments include a computer readable medium having computer readable code thereon for providing selective flow redistribution across MLT/LAG after port member failure and recovery. The computer readable medium includes method includes instructions for providing a table for each MLT/LAG, each table having at least one entry, each entry including at least two fields, a first field comprising a port member identification (ID) field and a second field comprising a port member status field. The computer readable medium further includes instructions for checking a port member status for a port when a packet flow hashes into the table, and determining the status for the port member. The compute readable medium also includes instructions wherein when the port member status is in a first state, then using the associated port member ID as a destination port to transmit to; and when the port member status is in a second state, then accessing a next entry in the port table to find a next available entry having a port member status that is in the first state and using the corresponding port member ID of the port member status that is in the first state as a destination port to transmit to.

Still other embodiments include a computerized device (e.g. a network device), configured to process all the method operations disclosed herein as embodiments of the invention. In such embodiments, the computerized device includes a memory system, a processor, communications interface in an interconnection mechanism connecting these components. The memory system is encoded with a process that provides selective flow redistribution across MLT/LAG after port member failure and recovery as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations provides selective flow redistribution across MLT/LAG after port member failure and recovery as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured Avaya, Inc. of Basking Ridge, N.J.

Note that each of the different features, techniques, configurations, etc. discussed in this disclosure can be executed independently or in combination. Accordingly, the present invention can be embodied and viewed in many different ways.

Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

When a logical port is implemented as part of a MLT, SMLT or LAG, there are actually multiple physical ports that are capable of forwarding a packet to its next hop on the network. Accordingly, if one of the ports of a MLT fails, it would be advantageous to cause the packet to be forwarded on one of the remaining ports so that the packet can traverse the network rather than being dropped Likewise, rather than designate a primary and backup port for each port in the MLT, it would be advantageous to load share the packets across the remaining ports of the MLT so that the packets may be distributed across the remaining ports that are UP. According to an embodiment, this process is implemented in hardware so that the fastpath (dataplane) can automatically accommodate individual and multiple port failures and automatically redirect packet traffic across the remaining ports in an equitable manner.

Figure 1:
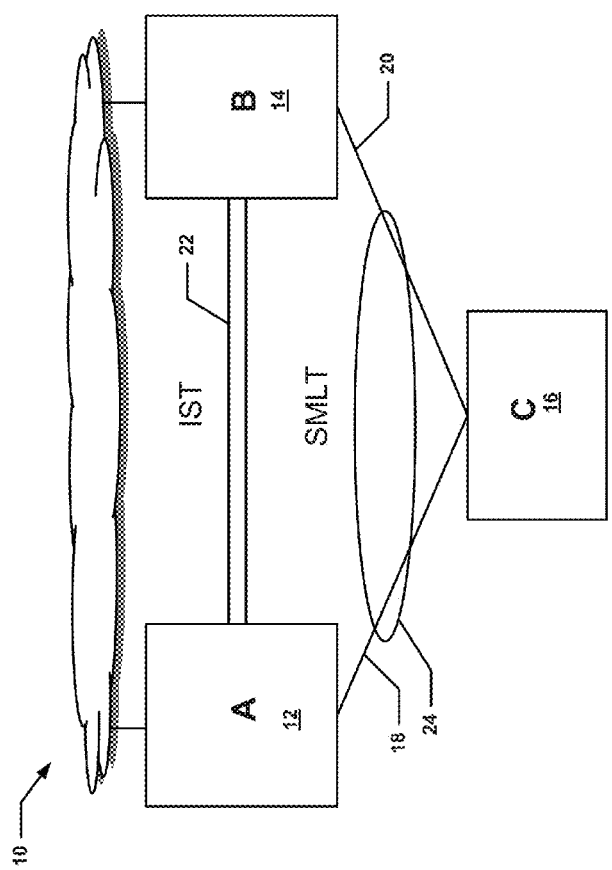
FIG. 1 is a block diagram showing an example multilink trunk network in accordance with embodiments of the invention.

FIG. 1 shows an example embodiment 10 in which network elements may be interconnected. Specifically, in this example node A (12) and node B (14) are interconnected by an inter-switch trunk (IST) 22 which may be a single link or itself may be a multi-link trunk. When the links of a multilink trunk are physically connected to two different network elements, the MLT is called a Split Multi-Link Trunk (SMLT). Nodes A and B each have one or more links that connects to node C (16), which may be grouped together to form SMLT 24. Thus, if node A has data (e.g. a frame/packet) to send to node C, node A may either select one of the SMLT links connected to it or may transmit the packet on one of the links associated with the Inter-Switch Trunk 26 to enable the node B to forward the data on one of its links associated with the SMLT to node C.

The presently described method and apparatus for performing selective flow redistribution restricts flow redistribution to only the affected (failed/recovered) ports. All flows that were distributed to go over unaffected ports remain unchanged. This technique provides consistent behavior irrespective of the number of failed/recovered ports; for instance, if two ports fail, then only flows on those two ports are redistributed and not the unaffected ports. Further, the affected flows are redistributed in an even manner across the remaining port members.

The presently described method and apparatus for performing selective flow redistribution uses one dedicated table for each MLT/LAG. This table is referred to as a port member table and maintains all active and non-active port members belonging to an MLT/LAG. The port member table is indexed by an n-bit hash identifier (ID). This hash ID is computed using a hash function over some selected fields within the packet. The port member table has $2^n$ entries where n is the width of the hash ID in bits. It is preferable that the value of n be selected such that the number of table entries $2^n$ is at least two times the number of maximum allowable port members per MLT/LAG. Each entry in the table includes at least two fields, namely a port member ID field and a port member status field. The port member status can either be in a first state (UP) or a second state (DOWN). Depending on the number of port members on a given MLT/LAG and the size of the entries, more than one entry in the table may have the same port member. The port members and their instances are evenly distributed across the table entries.

When a port member is operational, the port member table entry for the port has the port member status as a first state (UP). When one or more port members fail, the corresponding entries (including all duplicate entries) are changed from the first state to a second state (DOWN). When those ports are recovered, their corresponding entries (including duplicate entries) are changed from the second state back to the first state (UP). Note that during failure and recovery no affected port member is removed from or added to the port member table.

When a flow hashes into a port member table entry, the entry's corresponding port status is checked. If the port status is UP, then the port member ID is used as the destination port to transmit to. If the port status is DOWN, then the table is either scanned down or up from the selected entry to find the next available entry whose port status is UP. The port member of the found entry is used to transmit the packet to. Note that since the distribution of the port members across the table entries remains unchanged, only the affected ports are redistributed.

The port member distribution pattern across the port member table is done in such a manner that all the instances of a given port member in the table entries are preceded or followed by a different port member. This provides an even flow redistribution when this port member fails.

Figure 2:
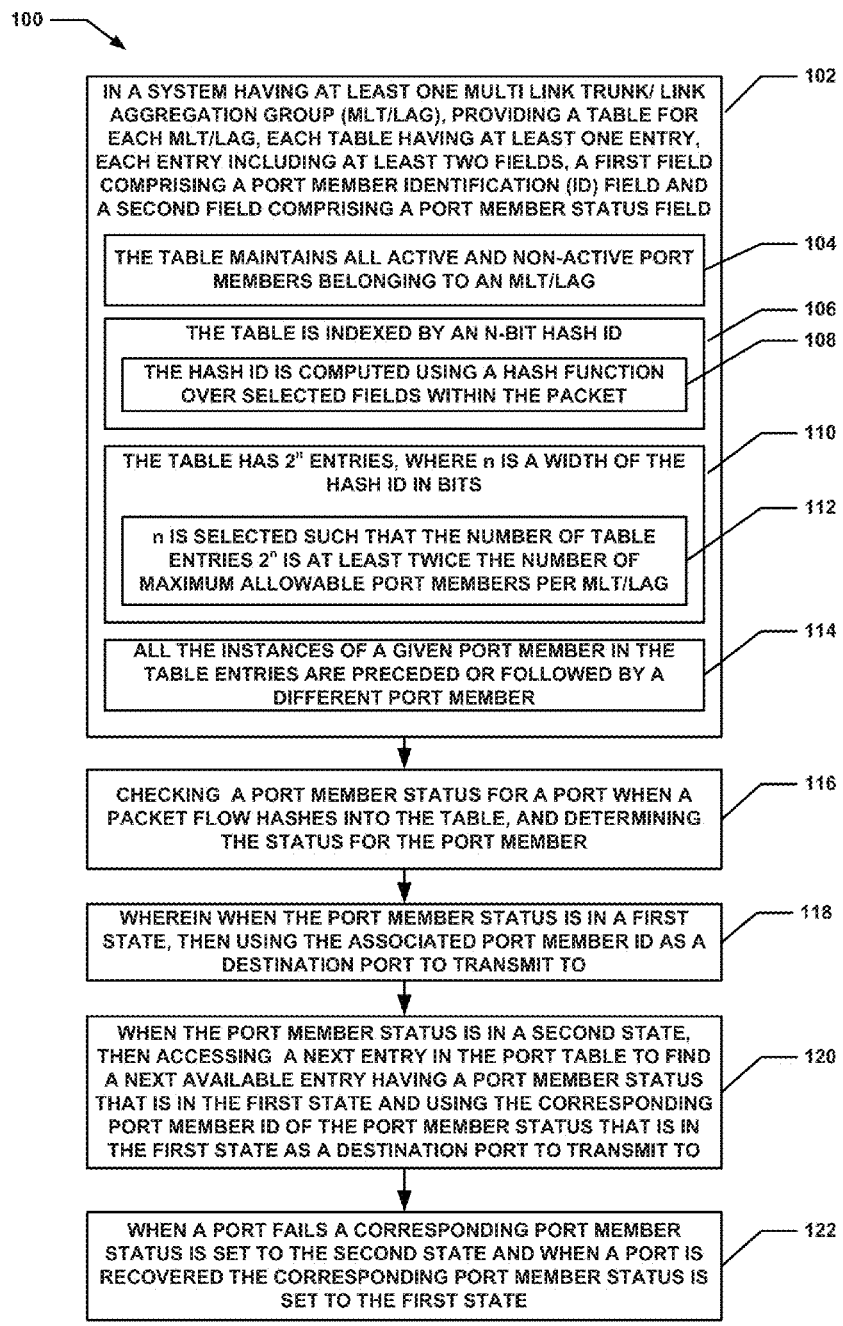
FIG. 2 comprises a flow diagram illustrating a particular embodiment of a method for providing selective flow redistribution across MLT/LAG after port member failure and recovery in accordance with embodiments of the invention.

A flow chart of a particular embodiment of the presently disclosed method of performing selective flow redistribution is depicted in FIG. 2. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 2, a particular embodiment of a method 100 of performing selective flow redistribution is shown. Method 100 begins with processing block 102 which discloses in a system having at least one Multi Link Trunk/Link Aggregation Group (MLT/LAG), providing a table for each MLT/LAG, each table having at least one entry, each entry including at least two fields, a first field comprising a port member identification (ID) field and a second field comprising a port member status field.

Processing block 104 states the table maintains all active and non-active port members belonging to an MLT/LAG. Depending on the number of port members on a given MLT/LAG and the size of the entries, more than one entry in the table may have the same port member.

Processing block 106 recites the table is indexed by an n-bit hash ID. As shown in processing block 108 the hash ID is computed using a hash function over selected fields within the packet.

Processing block 110 discloses the table has $2^n$ entries, where n is a width of the hash ID in bits. Processing block 112 states n is selected such that the number of table entries $2^n$ is at least twice the number of maximum allowable port members per MLT/LAG. It is preferable that the value of n be selected such that the number of table entries $2^n$ is at least two times the number of maximum allowable port members per MLT/LAG. As shown in processing block 114 all the instances of a given port member in the table entries are preceded or followed by a different port member. This provides an even flow redistribution when this port member fails.

Processing block 116 recites checking a port member status for a port when a packet flow hashes into the table, and determining the status for the port member. The port member status can either be in a first state (UP) or a second state (DOWN). Processing block 118 discloses when the port member status is in a first state, then using the associated port member ID as a destination port to transmit to. Processing block 120 states when the port member state is in a second state, then accessing a next entry in the port table to find a next available entry having a port member status that is in the first state and using the corresponding port member ID of the port member state that is in the first state as a destination port to transmit to. The port member of the found entry is used to transmit the packet to. Since the distribution of the port members across the table entries remains unchanged, only the affected ports are redistributed.

Processing block 122 recites when a port fails a corresponding port member status is set to the second state and when a port is recovered the corresponding port member status is set to the first state. When a port member is operational, the port member table entry for the port has the port member status as a first state (UP). When one or more port members fail, the corresponding entries (including all duplicate entries) are changed from the first state to a second state (DOWN). When those ports are recovered, their corresponding entries (including duplicate entries) are changed from the second state back to the first state (UP). Note that during failure and recovery no affected port member is removed from or added to the port member table.

Figure 3:
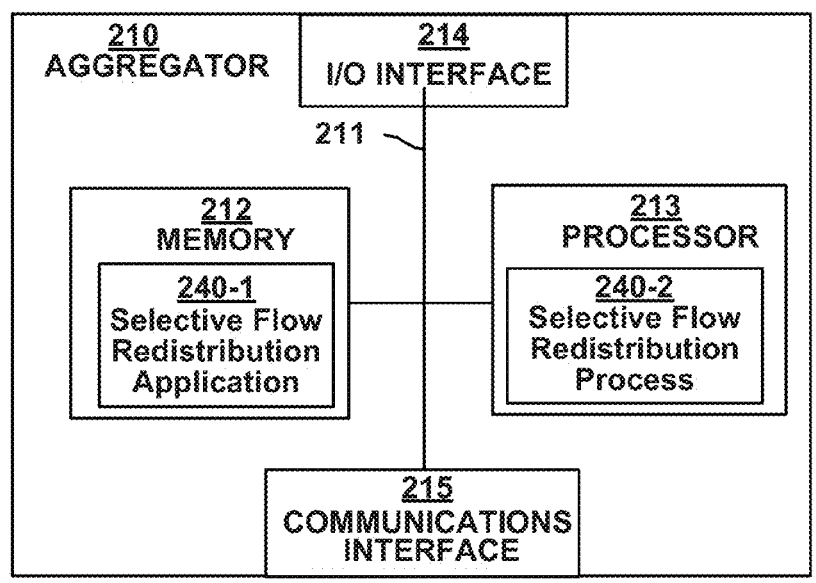
FIG. 3 illustrates an example computer system architecture for a network device that performs selective flow redistribution across MLT/LAG after port member failure and recovery in accordance with embodiments of the invention.

FIG. 3 is a block diagram illustrating example architecture of a computer system (e.g. a network device) 210 that executes, runs, interprets, operates or otherwise performs selective flow redistribution application 240-1 and selective flow redistribution process 240-2 suitable for use in explaining example configurations disclosed herein. As shown in this example, the computer system 210 includes an interconnection mechanism 211 such as a data bus or other circuitry that couples a memory system 212, a processor 213, an input/output interface 214, and a communications interface 215. The communications interface 215 enables the computer system 210 to communicate with other devices (i.e., other computers) on a network (not shown).

The memory system 212 is any type of computer readable medium, and in this example, is encoded with a selective flow redistribution application 240-1 as explained herein. The selective flow redistribution application 240-1 may be embodied as software code such as data and/or logic instructions (e.g., code stored in the memory or on another computer readable medium such as a removable disk) that supports processing functionality according to different embodiments described herein. During operation of the computer system 210, the processor 213 accesses the memory system 212 via the interconnect 211 in order to launch, run, execute, interpret or otherwise perform the logic instructions of a selective flow redistribution application 240-1. Execution of a selective flow redistribution application 240-1 in this manner produces processing functionality in the selective flow redistribution process 240-2. In other words, the selective flow redistribution process 240-2 represents one or more portions or runtime instances of a selective flow redistribution application 240-1 (or the entire a selective flow redistribution application 240-1) performing or executing within or upon the processor 213 in the computerized device 210 at runtime.

It is noted that example configurations disclosed herein include the selective flow redistribution application 240-1 itself (i.e., in the form of un-executed or non-performing logic instructions and/or data). The selective flow redistribution application 240-1 may be stored on a computer readable medium (such as a floppy disk), hard disk, electronic, magnetic, optical, or other computer readable medium. A selective flow redistribution application 240-1 may also be stored in a memory system 212 such as in firmware, read only memory (ROM), or, as in this example, as executable code in, for example, Random Access Memory (RAM). In addition to these embodiments, it should also be noted that other embodiments herein include the execution of a selective flow redistribution application 240-1 in the processor 213 as the selective flow redistribution process 240-2. Those skilled in the art will understand that the computer system 210 may include other processes and/or software and hardware components, such as an operating system not shown in this example.

During operation, processor 213 of computer system 200 accesses memory system 212 via the interconnect 211 in order to launch, run, execute, interpret or otherwise perform the logic instructions of the a selective flow redistribution application 240-1. Execution of a selective flow redistribution application 240-1 produces processing functionality in a selective flow redistribution process 240-2. In other words, the a selective flow redistribution process 240-2 represents one or more portions of the a selective flow redistribution application 240-1 (or the entire application) performing within or upon the processor 213 in the computer system 200.

It should be noted that, in addition to the selective flow redistribution process 240-2, embodiments herein include the selective flow redistribution application 240-1 itself (i.e., the un-executed or non-performing logic instructions and/or data). The selective flow redistribution application 240-1 can be stored on a computer readable medium such as a floppy disk, hard disk, or optical medium. The selective flow redistribution application 240-1 can also be stored in a memory type system such as in firmware, read only memory (ROM), or, as in this example, as executable code within the memory system 212 (e.g., within Random Access Memory or RAM).

In addition to these embodiments, it should also be noted that other embodiments herein include the execution of selective flow redistribution application 240-1 in processor 213 as the a selective flow redistribution process 240-2. Those skilled in the art will understand that the computer system 200 can include other processes and/or software and hardware components, such as an operating system that controls allocation and use of hardware resources associated with the computer system 200.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the Internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method comprising:
    in a system having at least one Multi Link Trunk/ Link Aggregation Group (MLT/LAG), providing a table for each MLT/LAG, each table having at least one entry, each entry including at least two fields, a first field comprising a port member identification (ID) field and a second field comprising a port member status field, wherein said table is indexed by an n-bit hash ID, and wherein said hash ID is computed using a hash function over selected fields within the packet;
    checking a port member status for a port when a packet flow hashes into said table, and determining the status for the port member;
    wherein when said port member status is in a first state, then using the associated port member ID as a destination port to transmit to; and
    when the port member state is in a second state, then accessing a next entry in said port table to find a next available entry having a port member status that is in said first state and using the corresponding port member ID of said port member state that is in said first state as a destination port to transmit to, and wherein said first state is UP and said second state is DOWN.

2. The computer-implemented method of claim 1 wherein said table maintains all active and non-active port members belonging to an MLT/LAG.

3. The computer-implemented method of claim 1 wherein said table has $2^n$ entries, where n is a width of the hash ID in bits.

4. The computer-implemented method of claim 3 where n is selected such that the number of table entries $2^n$ is at least twice the number of maximum allowable port members per MLT/LAG.

5. The computer-implemented method of claim 1 wherein all the instances of a given port member in the table entries are preceded or followed by a different port member.

6. The computer-implemented method of claim 1 wherein when a port fails a corresponding port member status is set to said second state and when a port is recovered the corresponding port member status is set to said first state.

7. A non-transitory computer readable storage medium having computer readable code thereon for selective flow redistribution, the medium including instructions in which a computer system performs operations comprising:
    providing a table for each MLT/LAG, each table having at least one entry, each entry including at least two fields, a first field comprising a port member identification (ID) field and a second field comprising a port member status field, wherein said table is indexed by an n-bit hash ID, and wherein said hash ID is computed using a hash function over selected fields within the packet;
    checking a port member status for a port when a packet flow hashes into said table, and determining the status for the port member;
    wherein when said port member status is in a first state, then using the associated port member ID as a destination port to transmit to; and
    when the port member state is in a second state, then accessing a next entry in said port table to find a next available entry having a port member status that is in said first state and using the corresponding port member ID of said port member state that is in said first state as a destination port to transmit to, and wherein said first state is UP and said second state is DOWN.

8. The computer readable storage medium of claim 7 wherein said table maintains all active and non-active port members belonging to an MLT/LAG.

9. The computer readable storage medium of claim 7 wherein said table has $2^n$ entries, where n is a width of the hash ID in bits.

10. The computer readable storage medium of claim 9 where n is selected such that the number of table entries $2^n$ is at least twice the number of maximum allowable port members per MLT/LAG.

11. The computer readable storage medium of claim 7 wherein all the instances of a given port member in the table entries are preceded or followed by a different port member.

12. The computer readable storage medium of claim 7 wherein when a port fails a corresponding port member status is set to said second state and when a port is recovered the corresponding port member status is set to said first state.

13. A network device comprising:
    a memory;
    a processor;
    a communications interface;
        an interconnection mechanism coupling the memory, the processor and the communications interface; and
    wherein the memory is encoded with an application providing selective flow redistribution, that when performed on the processor, provides a process for processing information, the process causing the first aggregation device to perform the operations of:
    providing a table for each MLT/LAG, each table having at least one entry, each entry including at least two fields, a first field comprising a port member identification (ID) field and a second field comprising a port member status field, wherein said table is indexed by n-bit hash ID, and wherein said hash ID is computed using a hash function over selected fields within the packet;
    checking a port member status for a port when a packet flow hashes into said table, and determining the status for the port member;
    wherein when said port member status is in a first state, then using the associated port member ID as a destination port to transmit to; and
    when the port member state is in a second state, then accessing a next entry in said port table to find a next available entry having a port member status that is in said first state and using the corresponding port member ID of said port member state that is in said first state as a destination port to transmit to, and wherein said first state is UP and said second state is DOWN.

14. The network device of claim 13 wherein said table maintains all active and non-active port members belonging to an MLT/LAG.

15. The network device of claim 13 wherein all the instances of a given port member in the table entries are preceded or followed by a different port member.

16. The network device of claim 13 wherein when a port fails a corresponding port member status is set to said second state and when a port is recovered the corresponding port member status is set to said first state.

* * * * *